United States Patent [19]

Jud

[11] 4,382,726
[45] May 10, 1983

[54] BORING TOOL
[75] Inventor: Bruno Jud, Ruggell, Switzerland
[73] Assignee: Jud AG, Switzerland
[21] Appl. No.: 262,651
[22] Filed: May 11, 1981

Related U.S. Application Data

[63] Continuation of Ser. No. 58,843, Jul. 19, 1979, abandoned.

[30] Foreign Application Priority Data

Oct. 6, 1978 [DE] Fed. Rep. of Germany ....... 2843778

[51] Int. Cl.³ .............................................. B23B 51/00
[52] U.S. Cl. .................................... 408/197; 408/181;
408/185; 408/186
[58] Field of Search ............... 408/152, 153, 185, 189,
408/197, 198, 181, 186, 190, 191; 407/44, 45

[56] References Cited

U.S. PATENT DOCUMENTS

| 1,049,589 | 1/1913 | Mitchell | 407/44 |
| 1,684,804 | 9/1928 | Pabst | 408/152 |
| 2,998,736 | 9/1961 | Cloutier et al. | 408/185 X |
| 3,220,288 | 11/1965 | Yogus | 408/181 X |
| 3,303,728 | 2/1967 | Testa | 408/197 |
| 3,937,587 | 2/1976 | Lindem et al. | 408/153 |

Primary Examiner—William R. Briggs
Attorney, Agent, or Firm—Townsend and Townsend

[57] ABSTRACT

The invention relates to a boring tool for producing stepped bores. The boring tool comprises a shaft having at least one longitudinally extending dovetail groove which is adapted to receive one or more tool holders forming a trapezoidal prismatic block. Each tool holder has clamping means for adjustably fixing a tool holder in a dovetail groove and has a continuous bore extending between two parallel lateral surfaces thereof. A rod-like cutting plate holder fits displaceably into the bore and is adjustably locked by locking means in the tool holder. The cutting plate holder has clamping means adapted to hold a cutting plate. A radial distance of each of the cutting plates from the axis of the boring tool and the longitudinal positions of the cutting plates may be adjusted to the desired positions, so that a stepped bore can be formed in one drilling operation.

5 Claims, 6 Drawing Figures

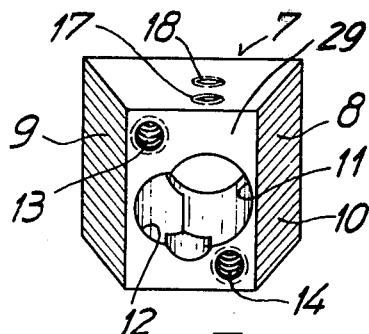
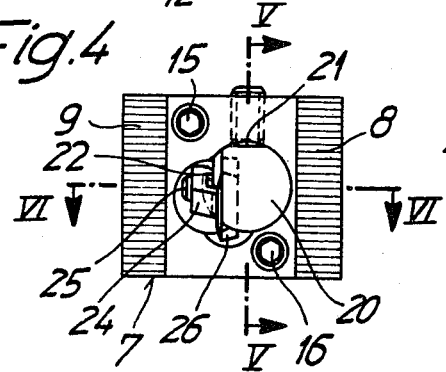
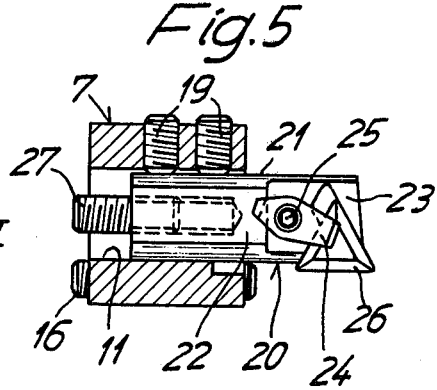
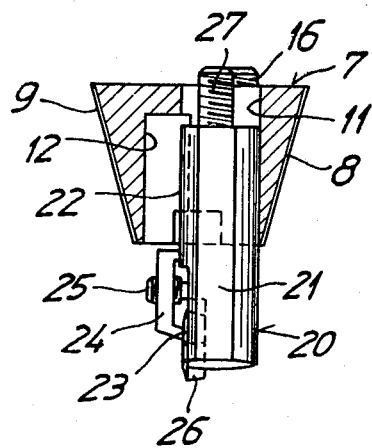

BORING TOOL

This is a continuation of application Ser. No. 058,843, filed July 19, 1979, now abandoned.

BACKGROUND OF THE INVENTION

This invention relates to a boring tool for forming stepped bores, comprising a stem and a receiving mandrel fixed thereto for clamping into a boring machine.

Hitherto, boring tools for forming stepped bores have been made separately for a certain bore using a stem on which bearing surfaces for the cutting plates serving as the actual cutting tool are machined out at the required places.

BRIEF SUMMARY OF THE INVENTION

The object of the present invention is to provide a boring tool which lends itself to various settings so that it may be adjusted for forming various stepped bores.

According to the invention, this object is achieved by at least one dovetail goove machined into the stem and running parallel to its axis, widening towards the axis, by a tool holder forming a trapezoidal prismatic block which fits into the dovetail groove, by at least one clamping means arranged on the tool holder and acting on the base of a dovetail groove, by a continuous bore in the tool holder which extends between the two parallel lateral surfaces thereof, by a rod-like cutting plate holder which fits displaceably into the bore and may be locked by locking means held in the tool holder, by a sharp-edged cutting plate, by a bearing surface for the cutting plate machined out on the cutting plate holder and by a clamping claw which is designed to be screwed to the cutting plate holder and which overlaps onto the cutting plate. With a boring tool such as this, it is possible to form stepped bores in which the individual steps are separated from one another by an axial interval substantially corresponding to the height of a tool holder. The radii of the individual steps may be adjusted by adjusting the cutting plate holder in the corresponding bore of the tool holder and by using tool holders of different lengths.

The stem preferably comprises two diametrically opposite dovetail grooves. In this way, it is possible to form stepped bores of which the indiviudal steps have an axial length shorter than the length of a tool holder.

Each dovetail groove may be provided with an opening having a width corresponding to the base of a dovetail groove. The tool holders may be inserted through this opening into the dovetail groove.

At its free end, the stem may be provided with a screw-threaded bore for attaching another stem so that it is also possible to form stepped bores having numerous steps.

At least one of the lateral surfaces of the tool holder which form an angle with one another is preferably provided with a knurled finish. This knurled finish and a knurled finish optionally provided on the adjoining face of the dovetail groove enable the tool holder to be immovably fixed.

The tool holder preferably comprises continuous screw-threaded bores extending between the parallel lateral surfaces for receiving tightening screws as clamping means.

In addition, the tool holder may be provided with bores extending from a trapezoidal end face into the bore for receiving screws serving as locking means for the cutting plate holder.

On the smaller lateral surface, the bore may be formed with at least one recess which accommodates the clamping claw and the cutting plate when the cutting plate holder is fully inserted into the bore.

According to another aspect of the invention, the cutting plate holder comprises an axially parallel flat zone which, in conjunction with the tightening screws, ensures that the cutting plate holder can be tightly fixed.

According to another aspect of the invention, the cutting plate holder is provided at the end remote from the bearing surface for the cutting plate with a screw-threaded bore which accommodates a set screw. By means of this set screw, it is possible to adjust the radius of the step to be formed in a stepped bore.

BRIEF DESCRIPTION OF THE DRAWINGS

One embodiment of the invention is described by way of example in the following with reference to the accompanying drawings, wherein:

FIG. 3 is a perspective view of a tool holder.

FIG. 4 is a side elevation of the smallest lateral surface of the tool holder.

FIG. 5 is a sectional view of the tool holder along the line V—V in FIG. 4 with the cutting plate holder inserted.

FIG. 6 is a plan view of the cutting plate holder with the tool holder shown in section.

DETAILED DESCRIPTION OF A PREFERRED EMBODIMENT

Figures 1, 2:
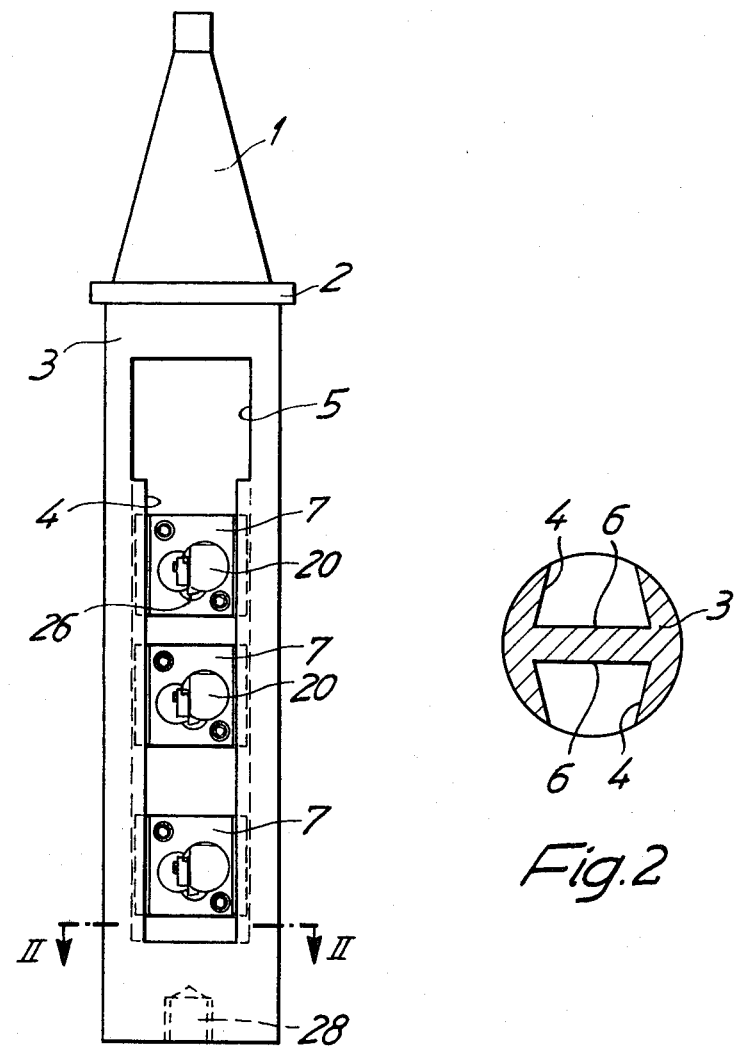
FIG. 1 is a side elevational view of a boring tool.
FIG. 2 is a cross section through the stem of the boring tool on the line II—II in FIG. 1.

The boring tool shown in the drawings comprises a receiving cone 1 which ends in a collar 2 and onto which a stem 3 is screwed. The receiving cone is used for attaching the boring tool to a machine tool and is therefore designed in accordance with the take-up thereof.

As can be seen from FIG. 2, the stem 3 has a cylindrical cross section and, over part of its length, comprises two diametrically opposite dovetail grooves 4 which widen towards the base 6. Each of the dovetail grooves 4 may be provided with an opening 5 having parallel side walls for the insertion of a tool holder which will be described hereinafter. However, other provisions may also be made for the insertion of tool holders into the dovetail grooves.

FIG. 3 to FIG. 6 show a tool holder 7. This tool holder 7 is in the form of a prismatic body with a trapezoidal base and comprises two lateral surfaces 8 and 9 forming an angle with one another and two parallel lateral surfaces.

The tool holder 7 is traversed by a bore 11 which extends between the two parallel lateral surfaces and is used to receive a cutting plate holder 20 which will be described hereinafter. Screw-threaded bores 13 and 14 extend parallel to the bore 11 and receive clamping screws 15 and 16 by which the tool holder 7 clamped fast after insertion into a dovetail groove 4, the clamping screws pressing against the base 6. The tool holder 7 further comprises a recess 12 which starts out from its front end 29 and which communicates with the bore 11, its function being to accommodate the parts fixed to the cutting plate holder when this holder is fully inserted into the bore 11.

The lateral surfaces 8 and 9 which form an angle with one another and the associated lateral surfaces of the dovetail groove 4 are provided with a knurled finish 10 to ensure that the tool holder can be immovably clamped in the direction of advance of the boring tool. However, it is also sufficient to provide only one of the lateral surfaces with a knurled finish.

The cutting plate holder 20 shown in FIGS. 4 to 6 may be inserted into the bore 11. The holder 20, which is in the form of a rod, has a flat zone 21 over its entire length and a second flat zone 22 extending normally to the first.

The flat zone 21 acts as a contact surface for locking screws 19 which can be screwed into threaded bores 17 and 18 in the tool holder 7 extending from a trapezoidal end face thereof into the bore 11.

The second flat zone 22 has a step 23 which is provided with a substantially triangular recess serving as supporting surface for a triangular sharp-edged cutting plate 26 made of a hard metal.

In that end of the cutting plate holder 20 remote from the step 23, there is a threaded hole accomodating a set screw 27 which acts as a stop and abuts against the base 6 of a dovetail groove. By means of this set screw 27, it is possible accurately to adjust the radius of the step of a stepped bore by adjusting the interval between the effective tip of the cutting plate 26 and the bearing surface of the set screw 27 to a value which corresponds to the required radius minus half the thickness of the land remaining between the bases 6 of the two dovetail grooves 4 (FIG. 2).

The free end of the stem 3 is formed with a threaded hole 28 which is used for attaching another stem so that it is even possible to form relatively long stepped bores.

The bore 11 is situated at such a point of the tool holder that the cutting edge of the cutting plate 26 is situated in the vertical plane of symmetry.

What is claimed is:

1. A boring tool comprising:
    an elongate stem having a longitudinal axis, said stem defining a trapezoidal dovetail slot parallel to said axis, the base of said slot being nearest said axis with the inwardly tapering sides extending from the base away from said axis;
    a trapezoidal toolholder having parallel inner and outer surfaces and angled sides tapering inwardly from said inner surface to said outer surface, said trapezoidal dovetail slot sized for sliding engagement of said toolholder within said slot;
    access means defined by said stem for inserting said toolholder into said slot;
    a rod-shaped cutting means having an inner end and a cutting end;
    said toolholder having a radially extending through bore between said parallel inner and outer surfaces sized for receipt of said cutting means;
    said cutting means including screw means for adjusting the length of said rod-shaped cutting means so that said inner end abuts said base of said slot;
    said toolholder having at least one threaded bore extending between said inner and outer surfaces and at least one threaded hole extending transverse to said radially extending bore between said radially extending bore and an outside surface of said toolholder;
    said cutting means including means for removably mounting a cutting plate at said cutting end of said cutting means and said bore including a recess portion extending into said toolholder form the outer surface thereof sized for receipt of at least a substantial portion of said cutting plate mounting means;
    first screw means threadably engaged within said threaded hole for locking said cutting means within said radially extending bore; and
    second screw means threadably engaged within said threaded bore for securing said tool holder and cutting means therewith within said slot.

2. The boring tool of claim 1 including a plurality of toolholders.

3. The boring tool of claim 1 wherein said cutting means includes a first flat zone between said inner and cutting ends located for engagement by said first screw means.

4. The boring toolholder of claim 1 wherein said angled sides of said toolholder have a knurled finish.

5. A boring tool comprising:
    an elongate stem having a first and second ends and a circumferential surface generally parallel to a longitudinal axis, said stem having a dovetail slot extending parallel to said axis and communicating with said surface of said stem, said slot having a trapezodial cross-sectional shape with the base of said slot nearest said axis and having convergently angled sides extending away from said base;
    a plurality of toolholders slidably positioned within said dovetail slot and having a trapezodial cross-sectional shape similar to that of said dovetail slot, said toolholder having inner and outer parallel surfaces, said inner surface opposite said base of said trapezoidal slot, and said toolholder having angled lateral surfaces extending from said inner to said outer surface, said toolholder having a radially extending through bore and at least one threaded bore extending between said inner and outer surfaces, said toolholder having at least one threaded hole transverse to and communicating with said radially extending bore and extending between said radially extending bore and an external surface of said toolholder;
    an adjustable length elongate cutter having an inner end, a cutting end and a longitudinal surface, said cutter sized for insertion within said radially extending bore, said cutting end having means for removably mounting a cutting plate thereat;
    said bore including a recess portion, extending into said toolholder from the outer surface thereof, sized for receipt of at least a substantial portion of said cutting plate mounting means therein;
    first screw means threadably engaging said at least one threaded hole for locking said cutter within said radially extending bore of said toolholder;
    said cutter having a flat area on said longitudinal surface for engagement by said first screw means; and
    second screw means threadably engaging said at least one threaded bore for engaging the base of said slot thereby securing said toolholder within said slot at a chosen position along said slot by biasing said angled lateral surfaces of said toolholder against said angled sides of said slot.

* * * * *